(12) United States Patent
Kindarji et al.

(10) Patent No.: US 8,972,727 B2
(45) Date of Patent: Mar. 3, 2015

(54) METHOD OF IDENTIFICATION OR AUTHORIZATION, AND ASSOCIATED SYSTEM AND SECURE MODULE

(75) Inventors: Bruno Kindarji, Paris (FR); Hervé Chabanne, Paris (FR); Julien Bringer, Paris (FR)

(73) Assignee: Morpho, Paris (FR)

( * ) Notice: Subject to any disclaimer, the term of this patent is extended or adjusted under 35 U.S.C. 154(b) by 837 days.

(21) Appl. No.: 13/130,458
(22) PCT Filed: Dec. 4, 2009
(86) PCT No.: PCT/FR2009/052420
§ 371 (c)(1),
(2), (4) Date: May 20, 2011
(87) PCT Pub. No.: WO2010/066992
PCT Pub. Date: Jun. 17, 2010

(65) Prior Publication Data
US 2011/0231667 A1    Sep. 22, 2011

(30) Foreign Application Priority Data

Dec. 8, 2008  (FR) ...................................... 08 58364

(51) Int. Cl.
*H04L 9/32*    (2006.01)
*G06K 9/00*    (2006.01)
*G06K 9/62*    (2006.01)

(52) U.S. Cl.
CPC .......... *G06K 9/00885* (2013.01); *G06K 9/6215* (2013.01); *H04L 9/3231* (2013.01); *H04L 2209/805* (2013.01)
USPC ....................................................... 713/168

(58) Field of Classification Search
None
See application file for complete search history.

(56) References Cited

U.S. PATENT DOCUMENTS

| | | | |
|---|---|---|---|
| 8,180,121 B2 * | 5/2012 | Bolle et al. .................... | 382/124 |
| 2008/0298642 A1 * | 12/2008 | Meenen ....................... | 382/115 |
| 2009/0022374 A1 * | 1/2009 | Boult ........................... | 382/119 |
| 2009/0296994 A1 * | 12/2009 | Zhang et al. ................. | 382/115 |

FOREIGN PATENT DOCUMENTS

| | | |
|---|---|---|
| EP | 1 835 443 | 9/2007 |
| JP | 2000293643 A | 10/2000 |
| JP | 2007249339 A | 9/2007 |
| WO | WO 02/095657 A2 | 11/2002 |
| WO | WO 2007/029529 A1 | 3/2007 |
| WO | WO 2009/083528 | 7/2009 |

OTHER PUBLICATIONS

Julien Bringer, et al The best of both worlds: Applying secure sketches to cancelable biometrics, The Science of Computer Programming, vol. 74, pp. 43-51, dated Oct. 11, 2008.
C. Chen et al, Biometric Binary String Generation with Detection Rate Optimized Bit Allocation, IEEE Computer Society Conference on Computer Vision and Pattern Recognition. Workshop on Biometrics, Jun. 24-28, 2008.
Michiel Van Der Veen, et al. Face Biometrics with Renewable Templates Security, Steganography, and Watermarking of Multimedia Contents VIII, 1519 Jan. 2006, San Jose, California, USA.
Feng Hao, A Fast Search Algorithm for a Large Fuzzy Databse, IEEE Transactions on Information Forensics and Security, vol. 3, No. , Jun. 2008.
Xu, et al. Spectral Minutiae: A Fixed-Length Representation of a Minutiae Set, IEEE, 2008.
Search Report from related PCT Application No. PCT/FR2009/052420 dated Apr. 12, 2010.

* cited by examiner

*Primary Examiner* — Brandon Hoffman
(74) *Attorney, Agent, or Firm* — Miller, Matthias & Hull LLP

(57) ABSTRACT

Method of identification or of authorization using a system comprising at least one sensor for acquiring biometric data and one secure module storing a set of digital data obtained starting from a set of respective biometric data by means of a digitization algorithm. According to this method, a biometric data value is obtained, acquired by the sensor; a digital value is obtained by application of the digitization algorithm to the acquired biometric data value; within the secure module, at least some of the digital data from said set of digital data are ranked according to their proximity to the digital value obtained; and a biometric data value is obtained from said set of biometric data by taking into account a position of the corresponding digital data within the ranking.

15 Claims, 3 Drawing Sheets

METHOD OF IDENTIFICATION OR AUTHORIZATION, AND ASSOCIATED SYSTEM AND SECURE MODULE

CROSS-REFERENCE TO RELATED APPLICATIONS

This application is a U.S. national stage filing under 35 USC §371 of International Patent Application No. PCT/FR2009/052420 filed on Dec. 9, 2009, which claims priority under the Paris Convention to the French Patent Application No. 08 58364, filed on Dec. 8, 2008.

FIELD OF THE DISCLOSURE

The present invention relates to identification and/or authorization based on biometric data.

BACKGROUND OF THE DISCLOSURE

The identification generally consists in recovering the identity of an individual based on one of his biometric data.

This is shown schematically in FIG. 1, where it is carried out by means of a system comprising a biometric database M storing biometric data $b_1, \ldots, b_N$ relating to respective individuals and previously obtained during a phase referred to as registration phase, and a biometric sensor C capable of acquiring such biometric data.

The biometric data can be of any type and relate to any characteristic of an individual, such as an iris, one or more fingerprints, minutiae, a face, the palm of a hand, a vein network of a finger or of a hand, a combination of the preceding characteristics, or others.

When an individual presents himself for an identification, a biometric data value b' relating to this individual is obtained by means of the sensor C, then is compared, in turn, with each of the biometric data $b_1, \ldots, b_N$ until a correspondence with one of these biometric data, $b_{i1}$, is established.

Using this biometric data $b_{i1}$, an identity $i_{i1}$ for the individual whose biometric data b' has been acquired is found. This identity $i_{i1}$ is for example stored in relation to the biometric data $b_{i1}$.

An authorization is simply distinguished from the identification that has just been described by the fact that the biometric data $b_o$ obtained is not used to find the identity of the individual whose biometric data b' has been acquired, but in order to grant any type of authorization to this individual, such as an authorization for access to a site, an authorization for the delivery of a product, of a document, or other. In a case of authorization, it is therefore possible to only require a response that b' has been detected as coming from one of the individuals in the registration database but without trying to read or to return an identity (which may therefore need not be stored in this case).

Owing to the complex and unstable nature of biometric data, the succession of the aforementioned comparison operations leads to a significant quantity of calculations. Thus, the results of the identification or of the authorization are only available after a relatively long period of time. Moreover, the processing capacity required imposes the use of relatively bulky systems.

Some attempts have been made to limit the quantity of calculations, without degrading excessively the reliability of the identification or of the authorization.

The article "A fast search algorithm for a large fuzzy database" by Feng Hao, John Daugman, Piotr Zielinski, published in June 2008 in "IEEE Transactions on Information Forensics and Security" is one example of this.

It promotes the idea of applying transformations to iris binary codes, such as rotations, permutations and extractions, so as to only conserve digital values of limited size. Comparisons based on these digital values are therefore greatly simplified with respect to the aforementioned ones carried out directly on biometric data.

Another drawback of the techniques hitherto described resides in their low level of protection of the biometric data.

This is particularly true in the case where the biometric data $b_1, \ldots, b_N$ are directly employed.

Even if these biometric data are stored in the biometric database M in an encoded manner, an uncoded version of these biometric data is however manipulated by the system, notably for purposes of comparison with the acquired biometric data value b'.

Thus, a person of criminal intent having access to the system could get hold of an unprotected version of the biometric data. The preservation of the identity of the corresponding individuals is not therefore assured.

In the case where less memory-hungry digital values are utilized to replace the biometric data, in accordance with the teaching of the aforementioned article "A fast search algorithm for a large fuzzy database", these digital values nevertheless provide information on the biometric data from which they originate. The identity of the corresponding individuals is therefore still not protected in this scenario.

One aim of the present invention is to improve the preservation of the identity of individuals whose biometric data has been acquired.

SUMMARY OF THE DISCLOSURE

The invention thus provides a method of identification or of authorization using a system comprising at least one sensor for acquiring biometric data and one secure module storing a set of digital data obtained starting from a set of respective biometric data by means of a digitizing algorithm, the method comprising the following steps:

/a/ obtain a biometric data value acquired by the sensor;

/b/ obtain a digital value by application of the digitization algorithm to the biometric data acquired;

/c/ within the secure module, carry out a ranking of at least some digital data from said set of digital data according to their proximity to the digital value obtained according to a proximity criterion; and /d/ obtain a biometric data value from said set of biometric data by taking into account a position of the corresponding digital data within the ranking.

The utilization of a secure module offers a protection against access by a person of criminal intent to the digital data that it contains. For this reason, these digital data are not accessible to such a person of criminal intent.

Furthermore, the biometric data starting from which said digital data are obtained can themselves be protected, for example by encoding and/or by storage within the secure module. The identity of the individuals to which said biometric data relate is therefore preserved.

Moreover, the storage and the advantageously simple processing of digital data rather than of biometric data can enable implementation by less sophisticated systems with a limited processing time.

The aforementioned digitization algorithm can for example be a quantizing algorithm configured to make a biometric data value relating to the same individual as one of the biometric data values of said set of biometric data correspond to a digital value fulfilling said proximity criterion with the digital data value corresponding to said biometric data value from said set of biometric data.

Advantageously, the following later steps can be implemented:

/e/ verify a correspondence between the biometric data obtained from said set of biometric data and the biometric data acquired by the sensor; and /f/ in the case of absence of correspondence, obtain a biometric data value from said set of biometric data corresponding to a digital data value of lower position in the ranking.

Such a verification makes the identification or the authorization reliable. The processing complexity that it results in remains furthermore reduced with respect to the systematic biometric comparisons of the prior art.

In this case, the secure module can be divided into at least two sub-sections arranged in order to communicate with one another in a secure manner, one of said sub-sections being responsible for the step /c/ and another of said sub-sections being responsible for the step /e/.

Advantageously, several sets of digital data coming from one or more sets of biometric data can be used.

The secure module can for example store at least a first and a second set of digital data each obtained from at least a first and a second respective set of respective biometric data by means of a respective digitization algorithm.

According to one advantageous embodiment that may be implemented in this situation: at least one biometric data value acquired by at least one respective sensor is obtained, at least a first and a second digital value are obtained by application to said acquired biometric data of each of the digitization algorithms, within the secure module, a ranking is carried out for at least some of the digital data from the first and second sets of digital data at least according to their proximity to each of the first and second digital values at least, and a biometric data value from one of either the first or second sets of biometric data at least taking into account a position of the corresponding digital data within the ranking.

An individual can thus be identified or authorized by acquiring at least one of any of his available biometric features (face, fingerprints, iris, etc.).

According to one advantageous embodiment that may be implemented in this same situation: at least a first and a second biometric data value acquired by respective sensors are obtained, at least a first and a second digital value are obtained by application of the respective digitization algorithm to at least the first and the second acquired biometric data, respectively, within the secure module, a ranking is carried out on a sub-set of digital data from the second set of digital data, according to their proximity to the second digital value, a biometric data value is obtained from the second set of biometric data taking into account a position of the second digital data value within said ranking, in which said sub-set of digital data from the second set of digital data is selected in order to correspond to a sub-set of biometric data from the second set of biometric data relating to the same individuals as a sub-set of biometric data from the first set of biometric data determined from the first digital value.

The identification or the authorization can thus be facilitated, because the ranking is only carried out on a limited amount of data. The time taken for convergence can therefore be reduced accordingly, without degrading the reliability of the identification or of the authorization.

Another subject of the invention is a system of identification or of authorization for implementing the aforementioned method, the system comprising at least one sensor for acquiring biometric data and one secure module storing a set of digital data obtained from a set of respective biometric data by means of a digitization algorithm, the system comprising:

/a/ means of obtaining a biometric data value acquired by the sensor;

/b/ a processing unit for determining a digital value by application of the digitization algorithm to the acquired biometric data;

/c/ a ranking unit for carrying out, within the secure module, a ranking of at least some of the digital data from said set of digital data according to their proximity to the digital value obtained according to a proximity criterion; and /d/ an identification or authorization unit for obtaining a biometric data value from said set of biometric data by taking into account a position of the corresponding digital data within the ranking.

The system in question can consist of a local system comprising a terminal including the sensor and with which the secure module is associated (e.g. by incorporation or by external communication). The secure module can for example take the form of a microchip capable of being included within the terminal.

As a variant, the system may be distributed. It can then comprise a centralized database storing at least a part of the biometric data and at least one decentralized terminal including a sensor. In this case, each secure module used can be associated with the centralized database, associated with at least one of the decentralized terminals or else associated, for one part, with the centralized database and, for another part, with at least one of the decentralized terminals.

The invention also provides a secure module for use within a system of identification or of authorization for the implementation of the aforementioned method and comprising at least one sensor for acquiring biometric data, the secure module comprising a memory for storing a set of digital data obtained from a set of respective biometric data by means of a digitization algorithm. The secure module furthermore comprises:

means for obtaining a digital value by application of the digitization algorithm to a biometric data acquired by the sensor;

a ranking unit for carrying out a ranking of at least some of the digital data from said set of digital data according to their proximity to the digital value obtained according to a proximity criterion; and an identification or authorization unit for obtaining a biometric data value from said set of biometric data by taking into account a position of the corresponding digital data within the ranking.

-BRIEF DESCRIPTION OF THE DRAWINGS

Other features and advantages of the present invention will become apparent in the description hereinafter of non-limiting exemplary embodiments, with reference to the appended drawings, in which.

DETAILED DESCRIPTION OF THE DISCLOSURE

Figure 2:
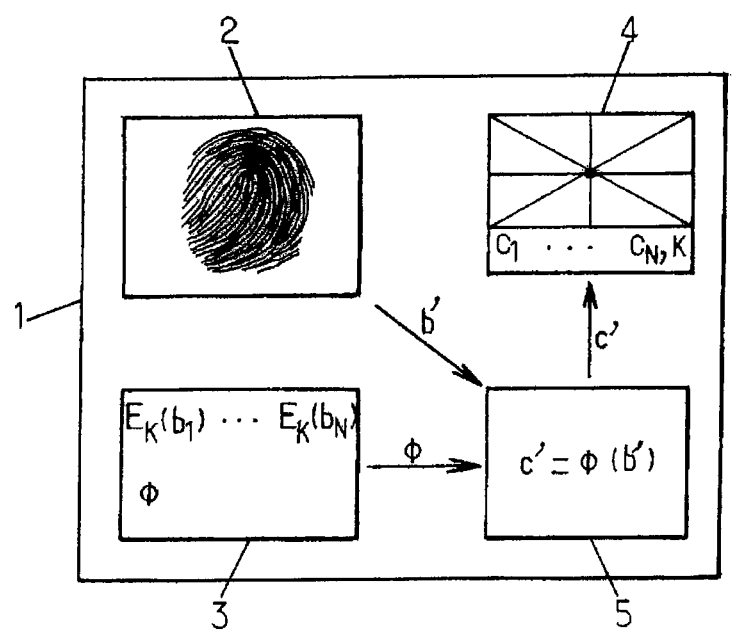
FIG. 2 is a diagram illustrating a first non-limiting example of system of identification or of authorization according to the invention.

FIG. 2 shows a first example of system of identification or of authorization according to the invention.

In this example, the system comprises a terminal 1 including a sensor 2 capable of acquiring biometric data which may be of any type and may relate to any given characteristic of an individual, such as an iris, one or more fingerprints, minutiae, a face, a palm of a hand, a vein network of a finger or of a hand, a combination of the preceding characteristics, or others.

Terminal 1 also comprises a secure module 4, in other words a unit providing a physical protection for the data that it contains. In the example in FIG. 2, this secure module consists of a microchip which is included in the terminal 1, for example during its design or by insertion of a printed circuit board, which may be a removable smartcard, inside this terminal 1.

The terminal 1 stores a set of biometric data $b_1, \ldots, b_N$ relating to respective individuals. These biometric data come, for example, from a prior registration of the corresponding individuals. They could have been obtained by means of the sensor 2 of the terminal 1, or else by any other suitable means, such as a sensor independent from the terminal 1.

These biometric data may be stored in a memory 3 of the terminal 1. In this case, they are preferably stored in an encoded manner, in order to avoid a person of criminal intent having access to the terminal 1 having access to the data. In the example in FIG. 2, this is illustrated by the references $E_K(b_1), \ldots, E_K(b_N)$, where E denotes an encoding algorithm and K a decoding key.

This solution is advantageous in that it simultaneously ensures two levels of data protection. Indeed, in addition to the physical protection of the digital data provided by the secure module 4 and which will be detailed hereinbelow, the storage in encoded form of the biometric data in a memory 3 separate from the secure module 4 provides another form of protection for these biometric data themselves.

The decoding algorithm employed may be of any type, for example symmetric or asymmetric. The algorithms AES and DES constitute non-limiting examples of usable decoding algorithms. Advantageously, the decoding algorithm selected can be chosen so that the corresponding decoding algorithm may be executed relatively quickly, in order to limit the required processing time.

The microchip 4 advantageously stores the decoding algorithm and/or the appropriate decoding key (which is symbolized by the reference to the decoding key K inside the microchip 4 in FIG. 2), in such a manner as to be able to recover the biometric data $b_1, \ldots, b_N$ starting from their encoded version stored in the memory 3.

As a variant, the biometric data $b_1, \ldots, b_N$ can be stored inside the microchip 4 when the latter has a sufficient storage capacity. In this case, the biometric data may be stored uncoded, since the microchip 4 ensures its physical protection.

A combination of these two storage modes, namely an encoded storage of part of the biometric data in a memory 3 and an uncoded storage of part of the biometric data within the microchip 4, may also be envisioned.

Furthermore, the biometric data $b_1, \ldots, b_N$ could be stored outside of the terminal 1, and could for example be accessible from an external database.

A set of digital data $c_1, \ldots, c_N$ is furthermore obtained starting from the respective biometric data $b_1, \ldots, b_N$ by means of a digitization algorithm Φ. In other words, $c_1=\Phi(b_1), \ldots, c_N=\Phi(b_N)$.

The digitization algorithm Φ is an algorithm that makes a digital data value and a biometric data value correspond. The digital data $c_1, \ldots, c_N$ thus obtained are potentially reduced in size with respect to the biometric data. By way of non-limiting example, this digitization algorithm makes a biometric data $b_i$ of the order of a kbyte correspond to a digital data value $c_i$ of only a few hundred bytes, or even less. The ratio of the sizes between digital data and biometric data is thus 1 to 10 or more (a ratio of 1 to 100 may also be envisioned).

In other words, the digitization algorithm CD may be seen as an algorithm for projection of the biometric data onto advantageously less memory-hungry digital data.

In one advantageous case, the digitization carried out in order to obtain a digital data value degrades the corresponding biometric data to a point where the positive identification against a large database is rendered ineffective.

The digitization algorithm Φ may furthermore consist of a quantizing algorithm configured to make a biometric data b' relating to the same individual as one of the biometric data values $b_i$ from amongst $b_1, \ldots, b_N$, correspond to a digital value c' fulfilling a proximity criterion with the digital data value $c_i$ corresponding to the biometric data $b_i$.

In other words, if a digital value c' has been obtained from a biometric data value b' by means of such a quantizing algorithm Φ, a proximity between c' and a digital data value $c_i$ from amongst $c_1, \ldots, c_N$ reveal that the biometric data b' and the biometric data $b_i$ corresponding to $c_i$ relate to the same individual, with a certain statistical probability of error.

This statistical probability of error relates to the false positives, in other words a proximity between the digital values without the individuals to which the corresponding biometric data relate being the same, and also to the false negatives, in other words an absence of proximity between the digital values corresponding to two biometric data coming from one and the same individual.

Because of this property, the quantizing algorithm Φ can allow biometric data of individuals to be recovered, with a certain level of confidence, starting from digital values of limited size.

The proximity criterion used can make use of a calculation of digital distance, such as a Hamming distance, an Euclidian distance, or other. In this case, the quantizing algorithm Φ can be such that $d(c_i, c') < d$ implying that c' has probably been obtained starting from a biometric data value b' relating to the same individual as $b_i$, where $c_i=\Phi(b_i)$, $d(c_i,c')$ represents for example the Hamming distance between $c_i$ and c' and d represents a given distance threshold.

Other digital distances may of course also be envisioned. Some are for example representative of the number of digital values that differ within the digital chains forming $c_i$ and c'. When these digital chains are binary, such a digital distance can for example be obtained by means of an exclusive OR operation between $c_i$ and c'.

Other types of proximity criteria are also possible as will be apparent to those skilled in the art.

The digitization algorithm may be any known algorithm. By way of non-limiting examples, the algorithms may be mentioned that are described in the article "Biometric binary string generation with detection rate optimized bit allocation" by C. Chen, R. N. J. Veldhuis, T. A. M. Kevenaar, and A. H. M. Akkermans published in June 2008 by the IEEE, and in the article "Face biometrics with renewable templates" by M. van der Veen, T. Kevenaar, G. J. Schrijen, T. H. Akkermans, and F. Zuo published in February 2006 by the SPIE.

The digitization algorithm is for example stored in the memory 3 of the terminal 1. As a variant, it could be stored in the microchip 4, or else outside of the terminal 1.

All of the digital data $c_1, \ldots, c_N$ is stored in the microchip 4, which ensures its protection. For this reason, any person potentially of criminal intent cannot access these digital data $c_1, \ldots, c_N$ and cannot therefore glean any information from these that would allow him to discover anything about the biometric data $b_1, \ldots, b_N$ from which the digital data have originated.

In addition, given that the size of the digital data $c_1, \ldots, c_N$ is much smaller than that of the corresponding biometric data $b_1, \ldots, b_N$, they can furthermore be stored in a microchip 4 with reduced memory capacity, which is not always the case for the biometric data $b_1, \ldots, b_N$ themselves.

When an individual presents himself for an identification or an authorization, one of his biometric data values b' is acquired by means of the sensor 2. When the sensor 2 is external to the terminal 1, in contrast to what was shown in FIG. 2, the biometric data value b' acquired by this sensor is transferred by any suitable means into the terminal 1, for the purposes of identification or of authorization.

A digital value c' is subsequently obtained by application of the digitization algorithm $\Phi$ to the biometric data value b' acquired by the sensor 2. This digital value c' is for example determined by a processing unit 5 of the terminal 1, to which a version of the biometric data b' and a version of the digitization algorithm $\Phi$ have previously been transmitted.

As a variant, the calculation of c' could be carried out by the microchip 4 itself. According to yet another variant, the calculation of c' could be performed by a unit external to the terminal 1, which assumes its later transfer terminal 1.

In any case, the digital value c' is made available to the microchip 4 for the purposes of identification or of authorization.

Figure 3:
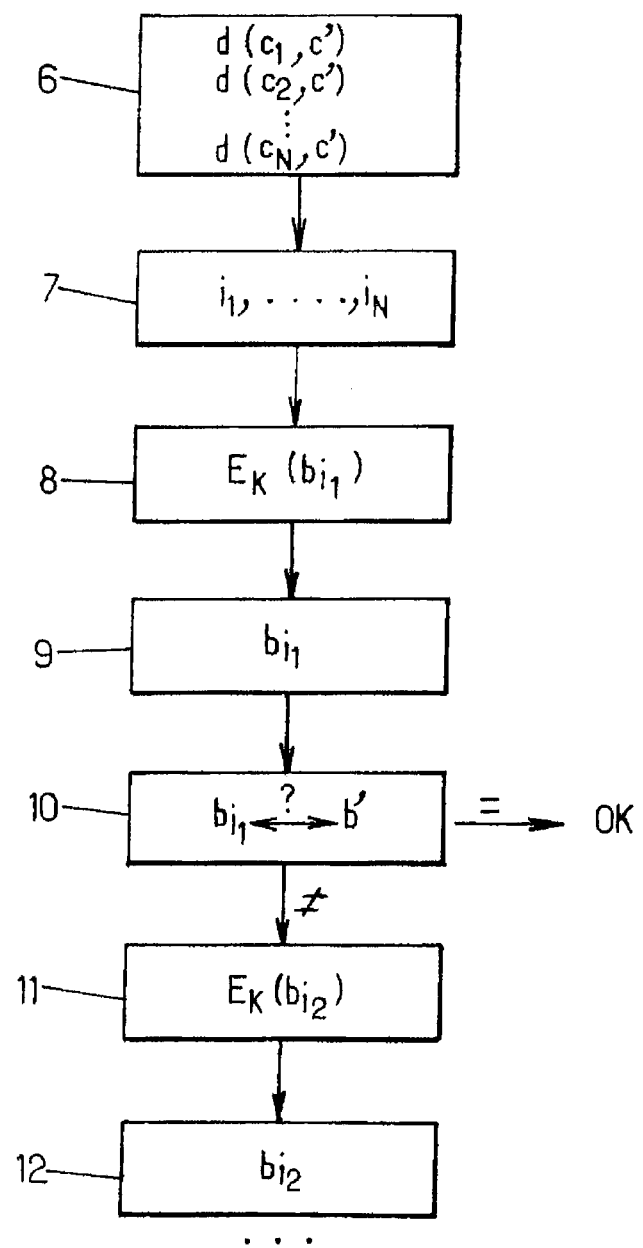
FIG. 3 is a diagram illustrating successive steps able to be implemented within the framework of the invention.

As illustrated in FIG. 3, the microchip 4 carries out an analysis of this digital value c' in relation to the digital data of which it disposes, in such a manner as to rank the digital data $c_1, \ldots, c_N$ in order of their proximity to c' according to the aforementioned proximity criterion.

This can for example be obtained by calculating a digital distance between the digital value c' and each of the digital data values $c_1, \ldots, c_N$ (step 6), then a ranking of the values $c_1, \ldots, c_N$ in the order of increasing distances thus calculated. This can for example result in an ordered list of the indices $i_1, \ldots, i_N$ selected from amongst $1, \ldots N$, representative of the ranking of the digital data $c_1, \ldots, c_N$.

Although in the example in FIG. 3, the proximity of c' is tested within the microchip 4, with each of the digital data $c_1, \ldots, c_N$, in practice, it could be that only a sub-section of the digital data $c_1, \ldots, c_N$ undergoes this ranking by the microchip 4.

For example, only the first p digital data values $c_1, \ldots, c_p$, with p<N, could be subjected to a test for proximity to c'. As a variant, all or part of the digital data $c_1, \ldots, c_N$, could undergo such a test, but only the digital data exhibiting a close enough proximity to c' could be subjected to the ranking.

The ranking is then utilized to determine the biometric data from amongst $b_1, \ldots, b_N$ which has the highest probability of relating to the same individual as b'.

In the example in FIG. 3, the index is the first in the list 7. This means that the corresponding digital data value $c_{i1}$ is the closest to c' in the sense of the aforementioned proximity criterion.

When the digitization algorithm $\Phi$ used is a quantizing algorithm such as defined hereinabove, its properties mean that the biometric data $b_{i1}$ such that $c_{i1}=\Phi(b_{i1})$ has a high probability of relating to the same individual as b'.

In order to facilitate the search, in this case, for the biometric data value $b_{i1}$ corresponding to the digital data value $c_{i1}$, based on the index it may be advantageous that the order in which the digital data $c_1, \ldots, c_N$ are stored in the microchip 4 be the same as that in which the biometric data $b_1, \ldots, b_N$ are stored for example in the memory 3. Different orders are nevertheless possible, as long as the biometric data $b_i$ corresponding to any digital data value $c_i$ can be recovered.

Again in the example in FIG. 3, the microchip 4 can then be capable of obtaining this biometric data $b_{i1}$, either because it contains it in its memory, or because it is capable of receiving an encoded version of it $E_K(b_{i1})$ (step 8) from the memory 3 of the terminal 1. In that latter case, after decoding it by means of the algorithm and/or of the key stored in its memory, the microchip 4 then disposes of the biometric data value $b_{i1}$ at the step 9.

This biometric data value $b_{i1}$ can be directly used for identifying or authorizing the individual who presents himself for this purpose. It will be noted that the value of $b_{i1}$ never comes out of the microchip 4 which accordingly ensures its protection.

Advantageously, an additional verification is carried out in order to increase the reliability of the identification or of the authorization. This additional verification can consist in carrying out a comparison between the biometric data $b_{i1}$ obtained at the step 9 and the biometric data b' acquired by the sensor (step 10). This biometric comparison can implement any conventional algorithm, depending on the nature of the biometric data used. It may be carried out within the microchip 4.

If the comparison reveals a correspondence between the biometric data b' and $b_{i1}$ with a sufficient level of confidence, it may be considered that the biometric data $b_{i1}$ is indeed representative of the same individual as b', which in turn allows the identification or the authorization to proceed on this basis. The value OK can accordingly be returned, as illustrated in FIG. 3 in the case of an authorization, or else an identity $i_{i1}$ corresponding to the biometric data $b_{i1}$, in the case of an identification.

Figure 1:
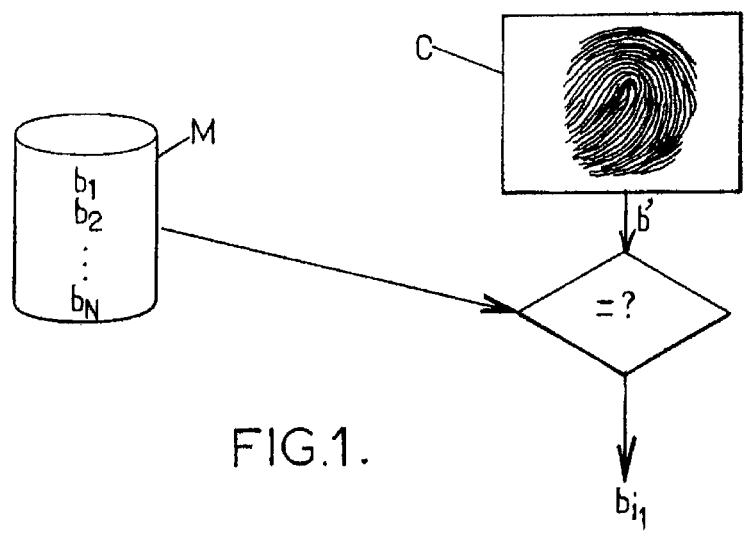
FIG. 1, already discussed, is a diagram illustrating an identification or authorization based on biometric data according to the prior art.

It will be noted that the sign "=" used in the FIG. 3 (as in FIG. 1) does not necessarily correspond to a strict equality of the biometric data compared, but to a biometric proximity test between these data, sometimes referred to as "matching", as is well known in the field of the biometry.

In the case of absence of a correspondence (in the sense of "matching"), on the other hand, it may be envisioned to continue the procedure by obtaining another biometric data value corresponding to a digital data value of lower position in the aforementioned ranking. As a variant, the process can stop there and indicate a failure (NOK).

By way of example of a continuation of the procedure, the biometric data value $b_{i2}$ corresponding to the digital data value $c_{i2}$ exhibiting the second highest proximity to the digital value c' according to the ranking established at the step 7, can be obtained, where necessary after decoding (steps 11 and 12).

This process can advantageously continue until a biometric data value from amongst $b_1, \ldots, b_N$ corresponding to the same individual as b' is obtained with a sufficient level of confidence.

In light of what has just been described, it will be understood that the quantity of calculations needed to accomplish the identification or the authorization is limited. This is because the calculations of distance performed at the step 6 are of reduced complexity since they are applied to digital values whose size is reduced. The biometric data $b_{i1}$ obtained at the step 9 can therefore be determined after a relatively short processing time. Furthermore, a microchip 4 with limited processing capacity is still capable of implementing these simples calculations.

A higher complexity is nevertheless required in the optional case where an additional verification is carried out between certain biometric data values, as has been described with reference to the step 10 and following ones. In most cases however, the number of verifications of such a complexity remains low owing to the potential properties of the digitization algorithm $\Phi$ introduced hereinabove.

According to an improvement of the example described with reference to FIGS. 2 and 3, several sets of digital data $c_1 \ldots c_N$ could be obtained, each one starting from the biometric data $b_1 \ldots b_N$ by means of a respective digitization algorithm $\Phi$.

In this case, the steps described above can be implemented in relation to each of the sets of digital data $c_1 \ldots c_N$. In particular, digital values c' each obtained by application of one of the digitization algorithms to the biometric data value b' may be calculated. Then, a ranking of at least some of the digital data from each of these sets can be carried out within the microchip 4 according to a proximity criterion such a the aforementioned one above.

A biometric data value from amongst $b_1 \ldots b_N$ can then be obtained by taking into account the various rankings carried out in relation to the various sets of digital data $c_1 \ldots c_N$. By way of example, the index from amongst $1, \ldots, N$ having the highest position considering the various rankings carried out can be retained as a first approximation in order to obtain the corresponding biometric data value. According to another example, the biometric data corresponding to the various digital data at the top of the respective rankings could be selected, then each be subjected to an additional verification so as to only retain one of them.

Other possibilities for obtaining a biometric data value from amongst $b_1 \ldots b_N$ taking into account a position of the digital data within various rankings may also be envisioned as will be apparent to those skilled in the art.

It is also possible to carry out a common ranking that takes into account various sets of digital data.

In any case, it will be understood that the use of several sets of digital data allows the choice of an associated biometric data value to be made reliable. Moreover, owing to the reduced size of the digital data, a microchip 4 with limited processing and storage capacities can nevertheless be capable of storing the various sets of digital data and of carrying out the aforementioned digital processing operations.

According to another improvement, which could be combined with the preceding one, it is possible to use several sets of biometric data $b_1 \ldots b_N$. In this case, various sets of digital data $c_1 \ldots c_N$ each correspond to one of these sets of biometric data by means of a respective digitization algorithm.

By way of example, the sets of biometric data could relate to different biometric features, for example fingerprints from respective fingers, a fingerprint for one feature and a face for the other, a fingerprint for one feature and a vein network for the other, a fingerprint, an iris and a palm print, of any combination of these that may be envisioned.

In this scenario, one or more acquisitions b' may be implemented by means of one or more sensors designed according to the nature of the various sets of biometric data. Respective digital values c' can then be obtained from the respective biometric data b'.

It should be noted that here there can be less biometric data captured than at the registration (for example ten fingers at the registration and only one at this step, the goal thus being to find at least one of the ten fingers).

There may also be cases where it is not possible to determine the precise nature (for example which of the ten fingers, which one of the right or left index, etc.) of the biometric data captured, but only a set of possible natures. All the digitization algorithms used during the registration and corresponding to this set of possibilities can then be applied in order to obtain as many digital values. The rankings generated from these digital values will subsequently allow a biometric data value to be obtained and, at the same time, the exact nature of b' to be recovered.

The result of the implementation of the previously described steps allows several biometric data originating from at least some of the available sets of biometric data to be obtained.

Several strategies may then be envisioned in order to proceed with the identification or the authorization. By way of example, each of the biometric data obtained could be compared with the biometric data acquired of the same nature, so as to only retain that which has the greatest probability of corresponding to the individual to be identified or to be authorized. In other words, at least one "matching" data value is sought without worrying about the links between the biometric data of the various sets of biometric data, i.e. it doesn't matter whether these biometric data are linked to the same individual or not (in order to compensate for example for the error when a finger is placed; e.g. left index instead of right).

As a variant, additional verifications could be implemented until the various biometric data obtained all relate to the same individual. In other words, a "reinforced" ranking may be applied taking into account the links between the biometric data, i.e. in relation to a registered individual.

As another variant, at least two different biometric features could be used: the first, with the aim of making a rapid selection of individuals (a list of possible candidates), and the second that will allow the individual corresponding to the captured biometric features to be identified, from amongst this selection, in a precise manner. In other words, the first ranking is used to make a selection of candidates (by considering, for example, the first k positions of the ranking) on which the second ranking is carried out. The second ranking is thus based on the proximity between the digital value obtained by application of a digitization algorithm to the second biometric feature and the only digital data relating to the individuals selected.

This can be carried out, for example, by using a first, not very discriminating, biometric feature, potentially not digitized or in combination with the digital value, prior to using a second, very discriminating, biometric feature (e.g. the face for selecting the candidates, then the iris for the identification; or else the vein network for selecting the candidates, then the fingerprint for the identification).

Other possibilities also exist, as will be apparent to those skilled in the art.

Other systems than that described with reference to FIG. 2 are furthermore capable of implementing the invention. For example, a much larger scale system could be used. In this latter case, the secure module could comprise one or more secure units, for example of the HSM (Hardware Security Module) type.

Although being larger and of higher capacity than a microchip, this type of module also offers a physical protection of the data, in such a manner that a person of criminal intent cannot gain access to its contents.

As in the preceding case, the processing complexity remains limited, notably with respect to systematic comparisons of biometric data by means of conventional algorithms.

All the operations described hereinabove, notably with reference to FIGS. 2 and 3, is applicable to a system of this type.

Such a type of biometric system can for example comprise one or more sub-sections of one or more HSM(s), one or more central database server(s) or not, one or more sensor(s), one or more digitizing server(s) and network links to allow communications between these various entities. An HSM could be divided into two sub-sections, at least one of which would be dedicated to the ranking of the $c_i$ and at least one other would be dedicated to the verification (matching), these HSM sub-sections, which can be physically separate, being arranged for communicating with one another in a secure manner. Other architectures may also be envisioned as will be apparent to those skilled in the art.

It will furthermore be noted that such a mode of operation is not exclusive to a complex biometric system. A terminal such as described with reference to FIG. 2 could indeed use a secure module divided into several sub-sections, which might be physically separated, such as several separate microchips each dedicated to certain tasks and capable of communicating with one another in a secure manner.

Figure 4:
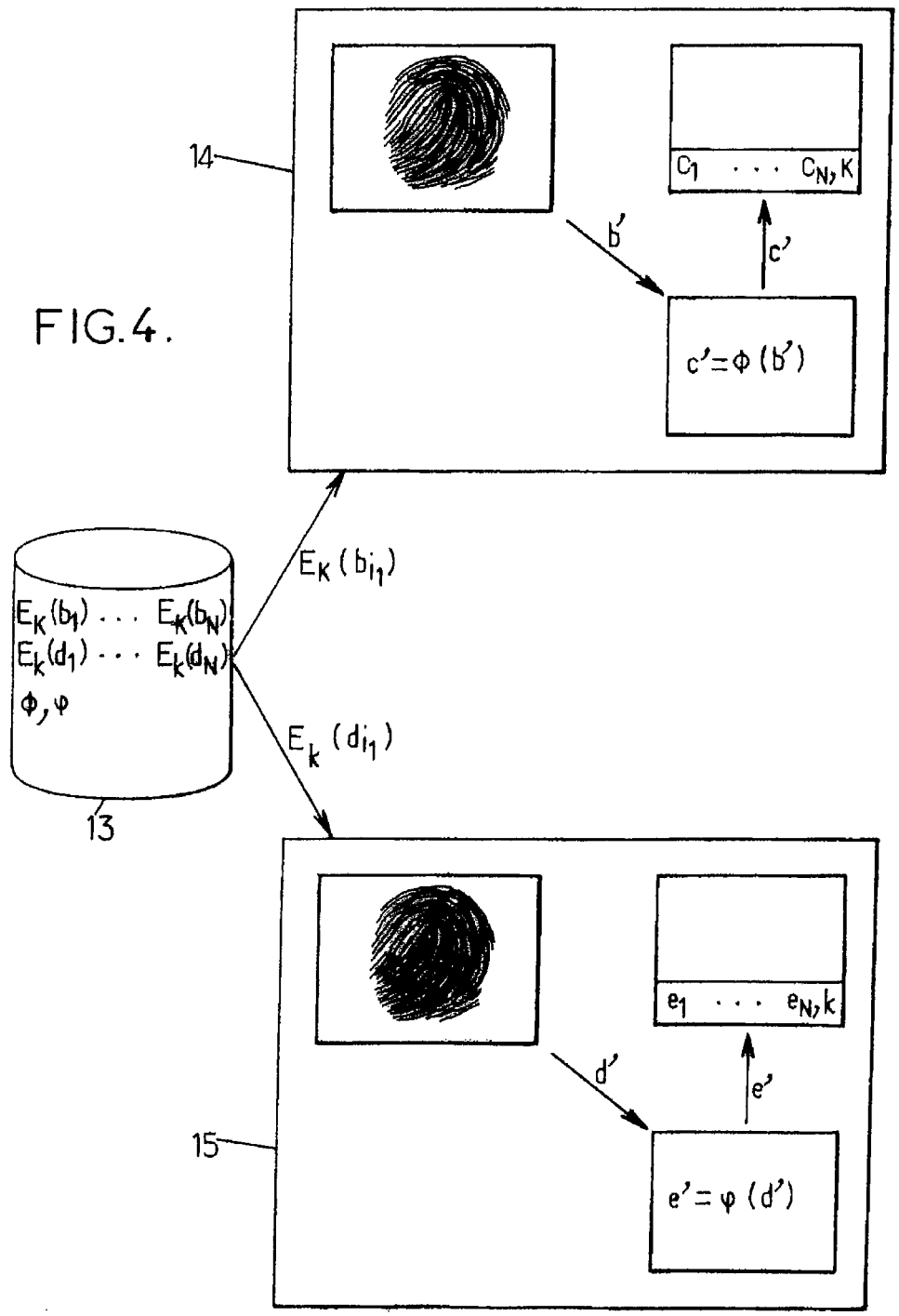
FIG. 4 is a diagram illustrating a second non-limiting example of system of identification or of authorization according to the invention.

FIG. 4 illustrates one example of a distributed system comprising a centralized database 13 and decentralized terminals 14 and 15. It will be noted that a single decentralized terminal or even a number of decentralized terminals greater than 3 could be used as a variant.

In this example, the database 13 contains several sets of biometric data, preferably encoded. It may also contain the digitization algorithms allowing the implementation of the method described hereinabove.

In the example illustrated in FIG. 4, the database 13 stores a set of biometric data $(E_K(b_1), \ldots, E_K(b_N)$ and $E_k(d_1), \ldots, E_k(d_N))$ together with a digitization algorithm ($\Phi$ and $\phi$ for each of the two decentralized terminals 14 and 15, respectively.

Advantageously, the database 13 can form part of the central workstation where the registrations are carried out, in other words the registration of biometric data prior to any verification.

Each of the terminals 14 and 15 can operate as the terminal 1 described above, after having obtained from the database 13, in a secure manner, for example by encoding, the biometric data necessary for its operation for the purposes of identification or of authorization.

Advantageously, the registration system also manages the transmission or the renewal of the data $c_i$ or $e_i$ stored in the terminals.

This type of architecture can for example be used on a site comprising a central workstation, where the registrations are carried out, and a plurality of rooms, the access to which is controlled by a respective terminal. In this case, the identity of the individuals registered is preserved by the encoding of their biometric data within the database 13 and by the physical protection provided by the secure modules of each of the terminals 14 and 15.

In addition, the terminals 14 and 15 can be of reduced complexity, since they operate on digital data of reduced size in comparison with the biometric data.

Generally speaking, the system can be local. It thus comprises a terminal including the sensor and with which the secure module is associated (e.g. by incorporation or by external communication). The secure module can, for example, take the form of a microchip capable of being included in the terminal.

As a variant, the system may be distributed. It can then comprise a centralized database storing at least a part of the biometric data and at least one decentralized terminal including a sensor. In this case, each secure module used may be associated with the centralized database, associated with at least one of the decentralized terminals or else associated, for one part, with the centralized database and, for another part, with at least one of the decentralized terminals. A part of the biometric data could also be stored within at least one of the decentralized terminals.

It will lastly be noted that all or part of the operations described hereinabove can be implemented by means of a computer program comprising suitable code instructions and cooperating with at least one secure module.

The invention claimed is:

1. A method of identification or of authorization using a system comprising at least one sensor for acquiring biometric data and one secure module storing at least a first and second set of digital data each obtained starting from at least a first and a second respective set of respective biometric data by means of a digitizing algorithm, the method comprising:
   /a/ obtain a biometric data value acquired by the sensor;
   /b/ obtain a digital value by application of the digitization algorithm to the biometric data acquired;
   /c/ within the secure module, carry out a ranking of at least some digital data from a set of digital data among at least one of the first and second set of digital data according to their proximity to the digital value obtained according to a proximity criterion; and
   /d/ obtain a biometric data value from a set of biometric data among at least one of the first and second set of biometric data by taking into account a position of the corresponding digital data within the ranking, wherein at least some of the biometric data values from at least one of the first and second set of biometric data are stored in an encoded manner in a memory external to the secure module.

2. The method as claimed in claim 1, furthermore comprising:
   /e/ verify a correspondence between the biometric data obtained from said set of biometric data and the biometric data acquired by the sensor; and
   /f/ in the case of absence of correspondence, obtain a biometric data value from said set of biometric data corresponding to a digital data value of lower position in the ranking.

3. The method as claimed in claim 2, in which the secure module is divided into at least two sub-sections arranged in order to communicate with one another in a secure manner, one of said sub-sections being responsible for the step /c/ and another of said sub-sections being responsible for the step /e/.

4. The method as claimed in claim 1, in which said proximity criterion makes use of a digital distance calculation, such as a Hamming distance.

5. The method as claimed in claim 1, in which said digitization algorithm is a quantizing algorithm configured to make a biometric data value relating to the same individual as one of the biometric data values of said set of biometric data correspond to a digital value fulfilling said proximity criterion with the digital data value corresponding to said biometric data value from said set of biometric data.

6. The method as claimed in claim 1, in which the secure module is configured for decoding the encoded biometric data.

7. The method as claimed in claim 1, in which at least some of the biometric data values from said set of biometric data are stored in an uncoded manner within the secure module.

8. The method as claimed claim 1, in which the size of the digital data from said set of digital data is smaller than the size of the respective biometric data from said set of biometric data.

9. The method as claimed in claim 1, in which the secure module stores at least two sets of digital data each obtained starting from a set of respective biometric data by means of a respective digitization algorithm, in which at least two digital values are obtained by application of the respective digitization algorithm to the biometric data acquired, and, within the secure module, at least some of the digital data from each of said sets of digital data are classified according to their proximity to the corresponding digital value according to a proximity criterion, and in which a biometric data value is obtained from said set of biometric data by taking into account a position of the corresponding digital data within the rankings.

10. The method as claimed in claim 1, in which at least one biometric data value acquired by at least one respective sensor is obtained, at least a first and a second digital value are obtained by application to said acquired biometric data of each of the digitization algorithms, within the secure module, a ranking is carried out for at least some of the digital data from the first and second sets of digital data at least according to their proximity to each of the first and second digital values at least, and a biometric data value from one of either the first or second sets of biometric data at least taking into account a position of the corresponding digital data within the ranking.

11. The method as claimed in claim 1, in which at least a first and a second biometric data value acquired by respective sensors are obtained, at least a first and a second digital value are obtained by application of the respective digitization algorithm to at least the first and the second acquired biometric data, respectively, within the secure module, a ranking is carried out on a sub-set of digital data from the second set of digital data, according to their proximity to the second digital value, a biometric data value is obtained from the second set of biometric data taking into account a position of the second digital data value within said ranking, in which said sub-set of digital data from the second set of digital data is selected in order to correspond to a sub-set of biometric data from the second set of biometric data relating to the same individuals as a sub-set of biometric data from the first set of biometric data determined from the first digital value.

12. The method as claimed in claim 1, in which the system is a local system comprising a terminal including the sensor and with which the secure module is associated.

13. The method as claimed in claim 1, in which the system is a distributed system comprising a centralized database storing at least a part of the biometric data and at least one decentralized terminal including a sensor.

14. A system of identification or of authorization comprising at least one sensor for acquiring biometric data and a secure module storing at least a first and second set of digital data each obtained starting from at least a first and second respective set of respective biometric data by means of a respective digitization algorithm, the system comprising:
 /a/ means of obtaining a biometric data value acquired by the sensor;
 /b/ a processing unit for determining a digital value by application of the digitization algorithm to the acquired biometric data;
 /c/ a ranking unit for carrying out, within the secure module, a ranking of at least some of the digital data from a set of digital data among at least one of the first and second set of digital data according to their proximity to the digital value obtained according to a proximity criterion; and
 /d/ an identification or authorization unit for obtaining a biometric data value from a set of biometric data among at least one of the first and second set of biometric data by taking into account a position of the corresponding digital data within the ranking, wherein at least some of the biometric data values from at least one of the first and second set of biometric data are stored in an encoded manner in a memory external to the secure module.

15. A secure module for use in a system of identification or of authorization and comprising at least one sensor for acquiring biometric data, the secure module comprising a memory for storing at least a first and a second set of digital data each obtained starting from at least a first and a second respective set of respective biometric data by means of a respective digitization algorithm, the secure module furthermore comprising:
 means for obtaining a digital value by application of the digitization algorithm to a biometric data acquired by the sensor;
 a ranking unit for carrying out a ranking of at least some of the digital data from a set of digital data among at least one of the first and second set of digital data according to their proximity to the digital value obtained according to a proximity criterion; and
 an identification or authorization unit for obtaining a biometric data value from a set of biometric data among at least one of the first and second set of biometric data by taking into account a position of the corresponding digital data within the ranking, wherein at least some of the biometric data values from at least one of the first and second set of biometric data are stored in an encoded manner in a memory external to the secure module.

* * * * *